Sept. 5, 1944.  H. O. KOCH  2,357,478
SNATCH LINK
Filed July 16, 1943

INVENTOR.
HARRY O. KOCH

Patented Sept. 5, 1944

2,357,478

UNITED STATES PATENT OFFICE 2,357,478

SNATCH LINK

Harry O. Koch, Wichita, Kans.

Application July 16, 1943, Serial No. 494,944

1 Claim. (Cl. 24—236)

This invention relates to a useful improvement in a snatch link, and has for its principal object a spring element to function as a snap, the spring being attached to the link as securing means therefor to a ring, U-bolt, or the like when the line of the link is detached or loosely engaged thereon.

A further object of this invention is to provide a V-shaped spring made from a single piece of metal and means to secure the spring to a snatch link so that both ends of said spring are free to move to and from contact with the free terminal ends of hook like elements integral with the link so that the loop of a U-bolt, ring, or the like will pass between the ends of the springs and that of the hooks; said spring being thus formed and connected to the snatch link is removable for replacement should the spring become deteriorated or lose its resiliency. It is true, however, that a plurality of hooks on a single link may have their respective spring elements.

These and other objects will hereinafter be more fully explained, reference being had to the accompanying drawing, forming a part of this specification, wherein like characters will apply to like parts in the different views.

Referring to the drawing.

Figure 1:
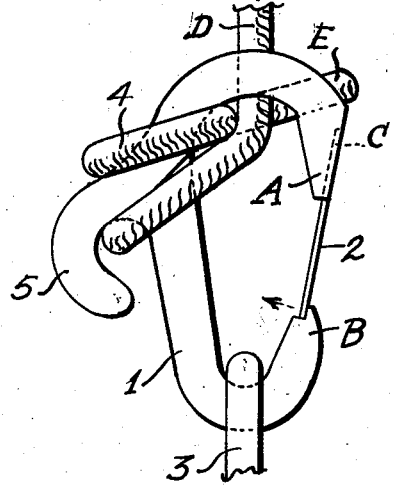
Fig. 1 is a plan view of a link having a portion of one of its sides removed, the opening thus formed being closed by a single spring.
Figure 2:
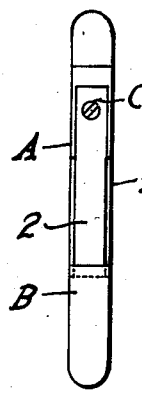
Fig. 2 is an edge view of Fig. 1.

Attention is directed that this invention is an improvement over my application for patent entitled, a Line snatch, filed June 5, 1943, Serial Number 489,854, and in which the said spring improvement herein referred to was not included. Therefore I now introduce a link 1 and a spring element 2 carried by the link, said link being similar to that embodied in said former application as illustrated in Fig. 6, except there being a portion of one side of the link removed, whereby confronting ends A and B are provided. In this respect it will be seen that spring 2 has one of its ends as at C rigidly secured to the link so that an intermediate point thereof will engage on the end A to spring thereover when the free end of said spring is pressed inward from contact with end B, the movement being in direction of the arrow shown in Fig. 1, whereby a ring or U-bolt 3 is insertible to secure the link stationary while a link 4 as looped to engage in the other end of the link will function as tensioning means for elements connected by said link, the tension being accomplished by opposite pulling of the line by gripping the same as at D and E, the latter being the free end of the line while the other is the anchoring portion to one element and the ring or U-bolt 3 secured to the other element, said elements not shown in the drawing, one of which may be a stake, and the other a gin pole or guy line of a tent, or the like. It will be seen that the line thus snatched will be rigidly retained as the line portion E is bound tightly to the inside of the link by line portion D seating thereon snugly under the tension imposed by the line D. As a means to insure the lapped engagement of the line, it will be seen that the said line is looped to engagement around a hook 5 integrally joined to the link at one end, the other end having a bend inward toward the link body and being spaced therefrom sufficiently to engage the line closely as passed through the space thus provided, whereby, when the line is released suddenly, the same will not freely disengage from the hook, and furthermore the ring or the like will be retained within the link by virtue of the spring but may be removed by pressing the said free end of the spring inward as indicated by the said arrow, and likewise when entered by force.

Figure 3:
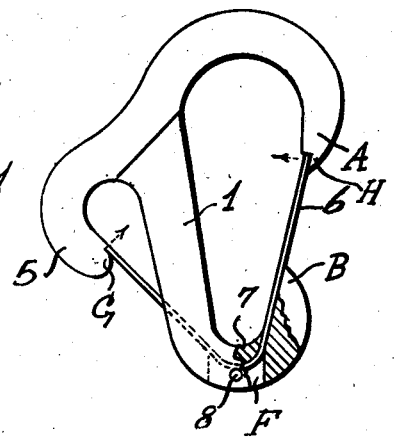
Fig. 3 is a plan view of a link having a double or V-shaped spring carried thereby, parts removed for convenience of illustration.
Figure 4:
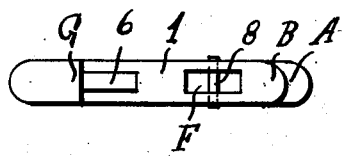
Fig. 4 is an end view of Fig. 3 to illustrate the openings through which the spring is insertible and the said spring as inserted.

In Fig. 3 is illustrated a similar link to that shown in Fig. 1, said link at one end being mortised as at F, (see Fig. 4) to receive a V-shaped spring 6, the legs of which are insertible therethrough so that their crotch will seat on an unremoved portion as at 7 to avoid further inward movement of the spring. There is also provided a pin 8 crossing the mortise adjacent the crotch of the spring to retain the same against removal except in case of an exchange, at which time the pin is removed. It will be seen that the free ends of the spring are adapted to engage with their respective hook ends G and H. Being so arranged, the loop of the line, as well as the said ring, U-bolt, or the like, is retained.

Figure 5:
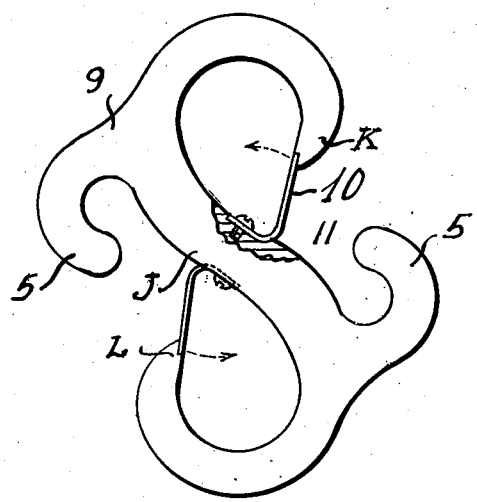
Fig. 5 is a plan view of a link having a pair of hooks and their respective springs.

In Fig. 5 is illustrated a link 9 reversible end for end or may be turned on its longitudinal axis reversely. However, said link has oppositely extending hooks for its ends and body portion, the end hooks each having a spring 10, one end of which is secured to the body of the link so that their free ends will engage with their respective hook ends K and L, whereby the link may be retained by a stationary hanger to avoid displacement or loss of the link when not engaged or during manipulation of the line, and such other modified use of the springs may be made as lie within the scope of the appended claim.

Having fully described my invention what I claim as new and desire to secure by Letters Patent is:

In a snatch link of the class described comprising an oblong body portion being formed to provide two confronting ends for the body in spaced relation and having a leaf spring to close the space between said confronting ends in such a way as to function as a snap to permit the said link to engage a U-bolt as an anchor seating in one end thereof, a hook integrally joined to the link adjacent its other end, and outwardly extending from the link as formed, said hook to be engaged by a line looped therearound and from thence extending through the said other end of the link in lapped engagement to frictionally bind the line against slipping when tensioned for the purpose specified.

HARRY O. KOCH.